Figure 1:
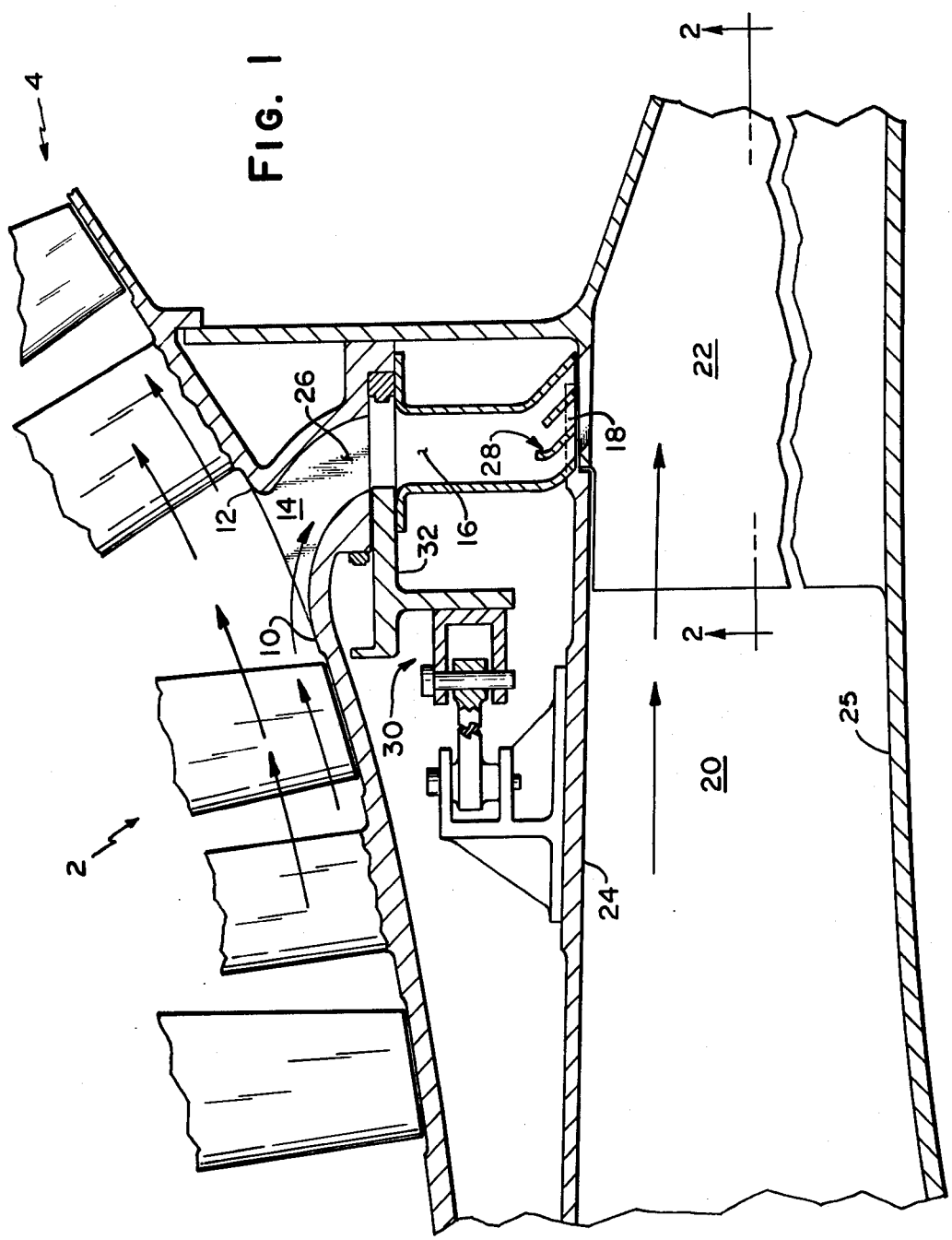

United States Patent

Monhardt et al.

[11] Patent Number: 4,463,552
[45] Date of Patent: Aug. 7, 1984

[54] COMBINED SURGE BLEED AND DUST REMOVAL SYSTEM FOR A FAN-JET ENGINE

[75] Inventors: Richard J. Monhardt; Louis Kudlacik, both of Glastonbury; John P. Nikkanen, West Hartford; Juri Niiler, Glastonbury, all of Conn.

[73] Assignee: United Technologies Corporation, Hartford, Conn.

[21] Appl. No.: 330,760

[22] Filed: Dec. 14, 1981

[51] Int. Cl.³ .............................................. F02K 3/06
[52] U.S. Cl. ................................. 60/226.1; 60/39.07; 60/39.092
[58] Field of Search ............... 60/39.07, 39.29, 39.092, 60/226.1; 415/DIG. 1; 55/306; 244/53 B

[56] References Cited

U.S. PATENT DOCUMENTS

| | | | |
|---|---|---|---|
| 2,986,231 | 5/1961 | Hellstrom | 60/39.07 |
| 3,108,767 | 10/1963 | Eltis et al. | 60/39.07 |
| 3,638,428 | 2/1972 | Shipley et al. | 60/39.29 |
| 3,680,309 | 8/1972 | Wallace, Jr. | 60/39.07 |
| 3,898,799 | 8/1975 | Pollert et al. | 60/39.07 |
| 4,055,946 | 11/1977 | Sens | 60/226.1 |

FOREIGN PATENT DOCUMENTS 2014663  8/1979  United Kingdom ............. 60/226.1

Primary Examiner—Carlton R. Croyle
Assistant Examiner—Jeffrey A. Simenauer
Attorney, Agent, or Firm—Norman Friedland

[57] ABSTRACT

Contaminated air injected by an axial flow fan jet engine is treated by centrifuging the contamination through the surge bleed valves into the fan discharge stream in an efficient manner.

3 Claims, 2 Drawing Figures

COMBINED SURGE BLEED AND DUST REMOVAL SYSTEM FOR A FAN-JET ENGINE

DESCRIPTION

1. Technical Field

This invention relates to fan-jet engines and more particularly to a combined surge bleed and dirt removal system.

2. Background Art

It is well known to provide surge bleed valves that typically are opened during engine start-up and other operations to unload the compressor so as not to induce compressor surge and/or stall. Generally in a fan-jet engine the bleed valve is mounted on the casing structure located between the fan duct and the compressor section. The air from the compressor, in a typical installation, is admitted into a plenum or cavity that surrounds the compressor in proximity to the junction point where the low compressor and high compressor are in communication. When the bleed valves are opened, the air in the cavity is dumped into the fan discharge stream at an angle normal to the flow therein.

We have found that by locating the bleed lines in a judicious location and directing the bleed flow to be discharged discretely with respect to the fan discharge flow, we cannot only separate the foreign matter collected in the core engine air stream but also minimize flow interference when discharging into the fan stream.

DISCLOSURE OF INVENTION

An object of this invention is to provide for a twin-spool axial flow fan-jet engine an improved surge bleed valve and control that also serves to remove foreign matter from the air injected into the core engine. A feature of this invention is the judicious location of bleed from the junction intermediate the first and second compressor spools and leading the bleed air through circumferentially spaced duct-like members that direct the discharged air axially into the fan discharge stream. Each duct-like member carries a bleed valve located intermediate its ends.

Other features and advantages will be apparent from the specification and claims and from the accompanying drawings which illustrate an embodiment of the invention.

DRIEF DESCRIPTION OF DRAWINGS

Figure 2:
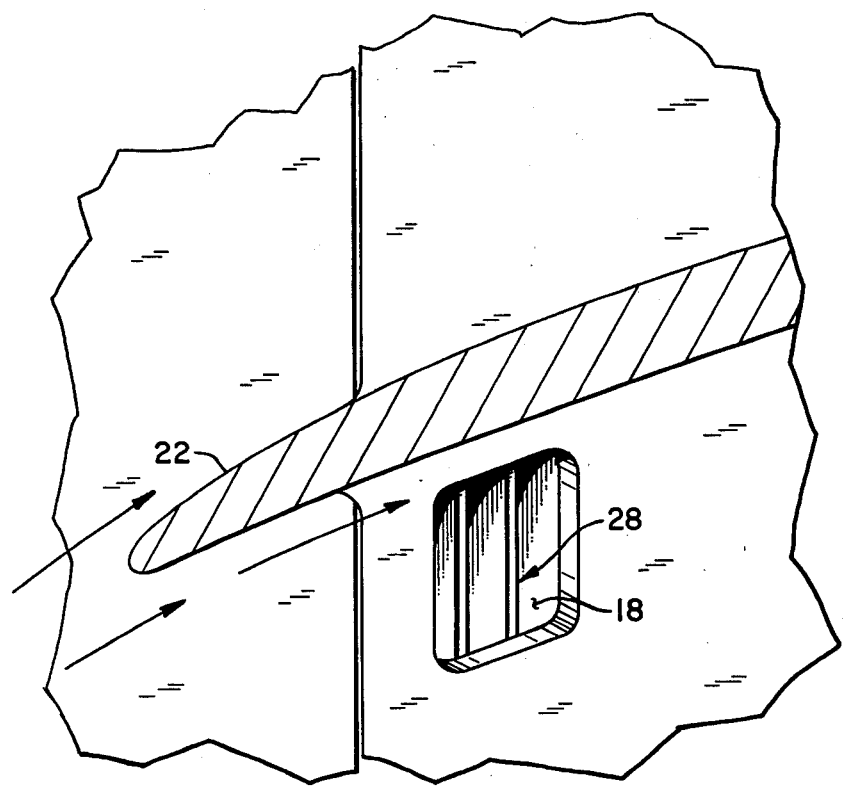

FIG. 1 is a partial view partly in section and partly in elevation showing this invention in schematic fashion; and FIG. 2 is a partial view primarily in elevation taken along lines 2—2 of FIG. 1.

BEST MODE FOR CARRYING OUT THE INVENTION

In its preferred embodiment this invention is utilized on a twin-spool axial flow fan-jet type of engine as those exemplified by the JT9D manufactured by Pratt & Whitney Aircraft Group of United Technologies Corporation, the assignee of this application and which is incorporated herein by reference.

For the sake of convenience and simplicity, the details of the engine are omitted herefrom and for an understanding of this invention suffice it to say that the low pressure compressor generally illustrated by the reference numeral 2 is driven by the low pressure turbine (not shown) and the high pressure compressor 4 is driven by the high pressure turbine (not shown). As can be seen from FIG. 1, the blades 6 of the high pressure compressor are angularly disposed relative to the blades 8 of the low pressure compressor and likewise the upstream wall 10 defining the casing for the low pressure compressor is angularly disposed (at a relatively sharp angle) relative to the downstream wall 12 defining the casing for the high pressure compressor. Also from FIG. 1 it will be appreciated that the upstream and downstream walls are spaced axially relative to each other to define an annular duct 14.

As can be seen from the foregoing, duct 14 extends circumferentially as defined by the configuration of the spaced walls 12 and 14 and is in communication with the core engine airflow. A plurality of circumferentially spaced passageways 16 (one being shown) extends outwardly from duct 14 to the window-like opening 18 formed in the inner casing member of the fan duct 20. In its preferred embodiment, the openings 18 are located in proximity to the exit stator vanes 22 of the fan duct and are specifically located in close proximity to the pressure side surface of the vanes 22 which extends between the inner wall 24 and the outer wall 25.

Angled flow straightening vanes 26 are circumferentially spaced in duct 14 at the entrance thereof and are inclined to the swirling flow entering therein from the last compressor stage of the low pressure compressor such that the angle of the swirling flow is equal to the angle of the flow straightening vanes 26. Flow deflectors 28 are disposed adjacent openings 18 for directing the discharging bleed air into the fan stream at a predetermined angle.

A suitable on-off type valve generally illustrated by reference numeral 30 serves to control the flow through duct 14 in order to bleed the compressor for stall prevention mode of operations. The actuating mechanism shown in schematic is connected to an on-off type control (not shown) which may be a switch that is activated by an operator or a signal generated by the fuel control and serves to position the ring-like element 32 to cut off the flow to passageway 16. Of course, each of the passageways 16 would be similarly controlled.

During "on" operation, in the position shown in FIG. 1, at the operating envelope where it is desired to bleed the core engine, as for example thrust reversal conditions, air mixed with dirt enters the compressor flow path and is centrifuged outwardly by the swirling flow as the core engine air passes through the arrays of stator vanes and rotor blades. Since the dirt is heavier than the air, it tends to follow the outer wall and enters the circumferentially extending duct 14. The dirt passes through the duct into the passageway 16 and flows into the fan passage (downstream of the fan) at an angle to the fan discharge flow selected to minimize interference upon contact.

By ducting the bleed air in this manner, not only is the surge prevention function accomplished but also this function is now combined with the dirt removal funtion. In addition, this invention affords these other advantages:

The openings 18 are located next to the pressure side surface of each stator vane 22 which causes the least aerodynamic disturbance. The bleed valve is steeply positioned in the flow path at the junction where the downstream wall 12 relative to the upstream wall 10 is angled, this sharp angle change, which constitutes a bend between the high and low compressor spools, enables the separation of dirt from the flow path. By positioning the bleed exit 18, in the vane passage between vanes 22, required a design which dead-ends each discharge opening to prevent recirculation which would otherwise occur due to pylon (not shown) induced distortion, placing the valve ring 32 between the discharge and inlet serves to isolate the exit.

It should be understood that the invention is not limited to the particular embodiments shown and described herein, but that various changes and modifications may be made without departing from the spirit and scope of this novel concept as defined by the following claims.

We claim:

1. A combined dirt removal and surge preventive bleed system for a fan-jet engine having twin spool axial flow compressors, housed in a generally cylindrical case having an outer wall, an annular duct means generally traverse to and complementing an opening in said outer wall adjacent the juncture where the last stage rotor of the low pressure compressor spool ends and the first stage stator of the high pressure compressor spool begins for leading compressor air into a plurality of circumferentially spaced radially extending passageways, ducting means defining said radially extending passageways, the fan portion of the engine having inner and outer wall means defining a fan discharge duct, a plurality of stator vanes circumferentially disposed in said fan discharge duct and extending between said inner and outer walls and a plurality of openings in said inner wall adjacent the pressure surface of said stator vanes communicating with each of said circumferentially spaced passageways defined by said ducting means for discharging said compressor air into the fan discharge stream in said discharge duct and in proximity to said pressure surface of said stator vane, means for directing said compressor air at a velocity and direction that does not impair the flow of said fan discharge air and valve means disposed in each of said passageways to prevent or allow the compressor air to flow through each of said passageways and the outer wall of said generally cylindrical case bending at said juncture to change direction of said compressor air passing from said low pressure stages of said twin spool axial flow compressor to said high pressure stages of said twin spool axial flow compressors.

2. A combined dirt removal and surge prevention bleed system as in claim 1, wherein said directing means includes flow straightening vanes in said annular duct means disposed in a direction such that its angle equals the angle of the swirling flow entering therein.

3. A combined dirt removal and surge preventive bleed system as in claim 2 including flow deflectors disposed at the exit end of said passageways to direct the exit flow at a predetermined direction with respect to the fan discharge flow.

* * * * *